(12) United States Patent
Hammarlund et al.

(10) Patent No.: US 6,662,173 B1
(45) Date of Patent: Dec. 9, 2003

(54) ACCESS CONTROL OF A RESOURCE SHARED BETWEEN COMPONENTS

(75) Inventors: Per Hammarlund, Hillsboro, OR (US); Robert Greiner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,377

(22) Filed: Dec. 31, 1998

(51) Int. Cl.[7] .......................... G06F 17/30; G06F 12/00
(52) U.S. Cl. ............................................ 707/2; 711/136
(58) Field of Search ................................ 711/136, 122, 711/163, 216, 118, 113; 712/211, 213; 707/401, 104, 2–3; 709/225, 216; 710/52

(56) References Cited

U.S. PATENT DOCUMENTS

| | | | | |
|---|---|---|---|---|
| 5,829,051 A | * | 10/1998 | Steely, Jr. et al. | 711/216 |
| 5,832,534 A | * | 11/1998 | Singh et al. | 711/122 |
| 5,845,331 A | * | 12/1998 | Carter et al. | 711/163 |
| 5,903,908 A | * | 5/1999 | Singh et al. | 711/122 |
| 6,105,111 A | * | 8/2000 | Hammarlund et al. | 711/136 |

OTHER PUBLICATIONS

Peter Song, Multithreading Comes of Age " Multithread Processors Can Boost Throughput on Servers, Media Processors", dated Jul. 14, 1997, pp. 13–18.

Dean M. Tullsen, Susan J. Eggers, Joel S. Emer, Henry M. Levy, Jack L. Lo, and Rebecca L. Stamm, Proceedings from the 23rd Annual International Symposium on Computer Architecture, "Exploiting Choice: Instruction Fetch and Issue on an Implementable Simulations Multithreading Processor", dated May 22–24, 1996, pp. 191–202.

Richard J. Eickemeyer, Ross E. Johnson, Steven R. Kunkel, Mark S.Squillante and Shiafun Liu, Proceedings from the 23rd Annual International Symposium on Computer Architecture, "Evaluation of Multithread Uniprocessors for Commercial Applications Environments", dated May 22–24, 1996, pp. 203–212.

Dennis Lee, Jean –Loup Baer, Brad Calder and Dick Grunwald, " Instruction Cache Fetch Pokicies for Speculative Execution", pp. 1–11.

Edited by Robert A. Iannucci, Gung R. Gao, Robert Halstead, Jr. and Burton Smith, Multithreaded Computer Architecture: "Summary of the State of the Art", James Laudon, Anoop Gupta and Maek Horowitz, Architectural and Implementation Tradeoffs in the Design of Multiple–Context Processors, pp. 166–200.

Simon W. Moore, "Multithreaded Processor Design", copyright 1996, pp. 1–141.

* cited by examiner

Primary Examiner—Safet Metjahic
Assistant Examiner—Susan Chen
(74) Attorney, Agent, or Firm—Kenyon & Kenyon (57) ABSTRACT

A resource including a plurality of elements, such as a cache memory having a plurality of addressable blocks or ways, is shared between two or more components based on the operation of an access controller. The access controller, controls which of the elements are accessed exclusively by a component and which are shared by two or more components. In one embodiment, the components include the execution of instructions in first and second threads in a multi-threaded processor environment. To prevent one thread from dominating the cache memory, a first mask value is provided for each thread. The access of the components to the cache memory is controlled by the first mask values. For example, the mask values can be selected so as to prevent a thread from accessing one or more of the ways in the cache (e.g., to evict, erase, delete, etc. a particular way in the cache). Also, the mask values can be set to allow certain of the ways in the cache to be shared between threads.

9 Claims, 4 Drawing Sheets

ACCESS CONTROL OF A RESOURCE SHARED BETWEEN COMPONENTS

BACKGROUND OF THE INVENTION

The present invention pertains to the control of access to a resource by two or more components. More particularly, the present invention pertains to selectively partitioning a resource (such as a cache resource) between two or more components that share the resource.

In a computer system or the like, main memory is provided (e.g., Dynamic Random Access Memory) for the storage of command information to be executed by a processor. The main memory can also store other forms of information besides command information including address information and data information that is manipulated through the execution of command information by the processor. Write and read operations to/from the main memory by the processor or any other device coupled to the main memory tend to be slow and time consuming. Accordingly, it is known in the art to provide an additional memory resource, such as a cache resource, coupled between the processor, for example, and the main memory. The cache resource stores information (e.g., command, address, and/or data information) that should be a copy of what is stored in the main memory or a more updated version of information stored in the main memory. A design feature of the cache resource is that it is typically faster to read/write information from/to the cache resource as compared to the main memory. For example, the cache memory can be Static Random Access Memory, which tends to be more expensive than DRAM but provides faster read/write transactions.

As stated above, the cache memory stores information that should be a copy of the same information as stored in the main memory or a more updated version. For example, the cache memory stores blocks (or "ways") of information that have addresses equivalent to addresses for the same information stored in main memory. A processor that seeks to perform a read or write operation from/to the main memory will provide an address to the cache memory, which includes control circuitry for determining if the addressed block resides in the cache memory (and in the main memory) or in the main memory alone. If the addressed block is in the cache memory (sometimes referred to as a "cache hit"), then the read or write operation continues with the block of information in the cache memory. If the addressed block is not in the cache memory (sometimes referred to as a "cache miss"), then the addressed block is retrieved from main memory and placed into the cache memory so that the read or write operation can continue.

When it becomes necessary to retrieve information from the main memory for the cache memory, it is usually necessary to "evict" an addressed block of information from the cache memory to make room. In doing so, one or more addressed blocks are erased (or overwritten by the new information from main memory). If the information from the cache is more up-to-date than the same addressed block in main memory, then during the eviction process, the addressed block is written to the main memory before being erased.

Several algorithms exist to determine which addressable block in the cache memory should be evicted when an addressable block of information needs to be written to the cache memory from the main memory. The Least Recently Used (LRU) algorithm is a common one that attempts to evict the addressable block that is the stalest block in the cache memory (i.e., the one block that has not been read from or written to the longest amount of time).

A problem can arise when the cache memory is shared by two or more components utilizing the cache memory. It is possible that one component can so dominate the cache memory resource that addressable blocks used by the other component will be evicted. Thus, read and/or write operations to the cache memory by the other component will often result in a cache miss. Cache misses lower the performance benefits of the cache because two operations may need to be performed. First, an eviction process may take place, where data in the cache is written back to the main memory. Second, a read operation from the main memory takes place for the addressed block of information. These two steps will typically take longer than a simple read/write operation at the cache memory. As used herein, a "component" is defined as any device or functional mechanism that uses the cache. For example, a component can include two or more threads executed by a processor, where a thread is a series of instructions whose execution achieves a given task (e.g., a subroutine). Components can also include data and instruction operations with the cache memory, the execution of specific types of instructions (e.g., a pre-fetch instruction), and speculative and non-speculative operations to the cache memory.

In view of the above, there is a need for an improved method and apparatus for controlling access to a resource by two or more components.

SUMMARY OF THE INVENTION

According to an embodiment of the present invention, an apparatus for sharing a resource between at least two components is provided. A resource having a plurality of elements is coupled to an access controller. First and second components are coupled to the access controller and adapted to access the elements of the resource. The access controller is adapted to control which of the components are able to access which elements of the resource.

DETAILED DESCRIPTION

Figure 1:
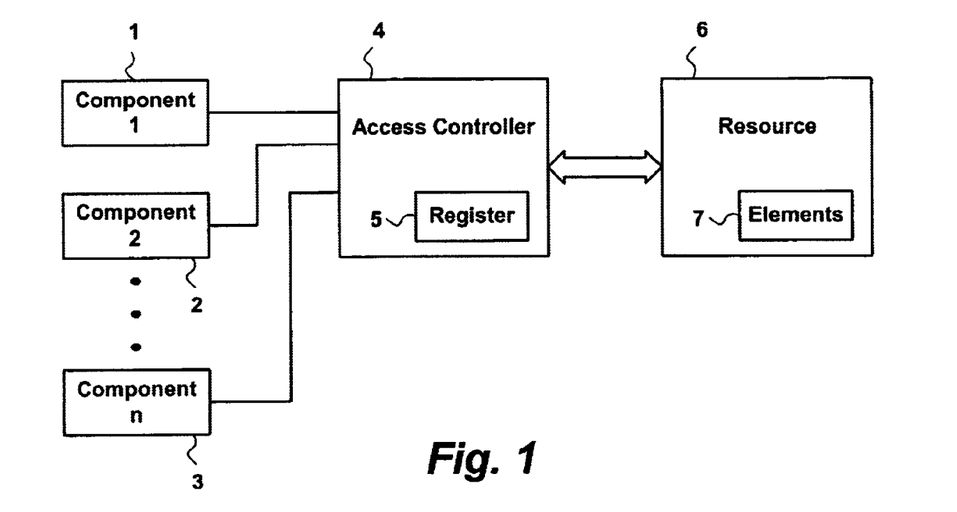
FIG. 1 is a block diagram of a resource system constructed according to an embodiment of the present invention.

Referring to FIG. 1, a resource system constructed according to an embodiment of the present invention is shown. A plurality of components (e.g. a first component 1, a second component 2, ..., an nth component 3) are coupled to a resource 6 via an access controller 4. Resource 6 is a device such as a memory or any other device that is accessed based on a LRU algorithm or the like includes a plurality of subparts or elements 7. For example, resource 6 may be a translate lookaside buffer (TLB) that stores recently used addresses for pages of memory in a main storage device; a cache memory; a structure of write-combining buffers, etc. Access controller 4 controls access of the components to the individual elements of the resource. For example, the access controller may allow any number of the elements to be evicted, deleted, erased, etc. exclusively by one or more components (i.e., a "destructive access" to the elements of the resource) and allow each component to perform read or write operations from/to all elements of the resource. The access controller may also allow any number of the elements to be shared by two or more components (e.g., elements can be evicted, deleted, erased, etc. only by the components sharing these elements). In one embodiment, access controller 4 includes at least one register 5 for storing one or more mask values. In this embodiment of the present invention, the components 1–3 are granted access to the elements of the resource based on the mask value(s) stored in the access controller. For example, the mask value(s) in register 5 can be set as desired to dynamically control how the elements of the resource are shared between selected components.

Figure 2:
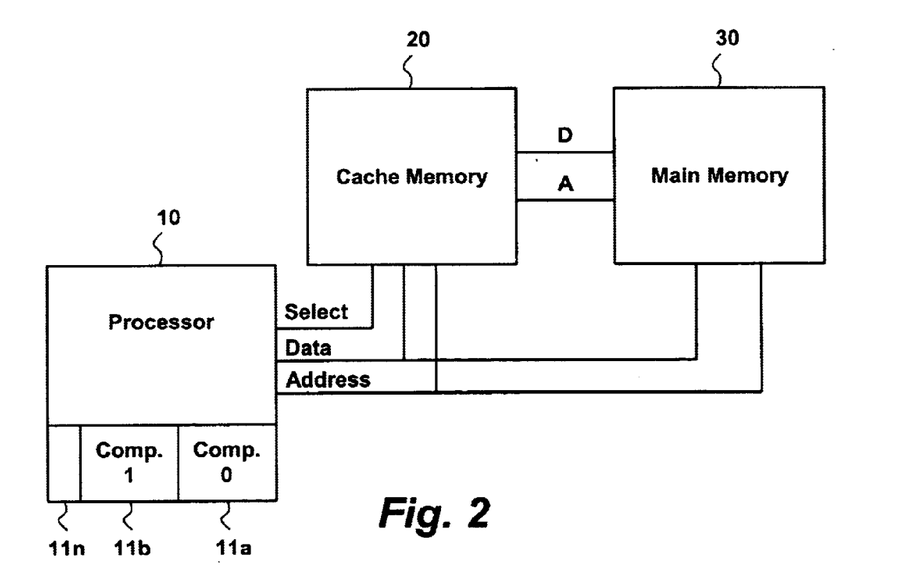
FIG. 2 is a block diagram of a memory system incorporating an embodiment of the present invention.

Referring to FIG. 2, a block diagram of a system incorporating an embodiment of the present invention is shown. In this embodiment, the resource is a cache memory including a plurality of addressable blocks or ways. A processor 10 is provided (e.g., a Pentium® II processor manufactured by Intel Corporation, Santa Clara, Calif.). Processor 10 reads and writes data from/to a main memory 30 (e.g., DRAM) and a resource such as cache memory 20. Cache memory 20 includes eight addressable blocks or ways in this example. One skilled in the art will appreciate that cache memory 20 may include more than one set of ways as shown in FIG. 3.

Figure 3:
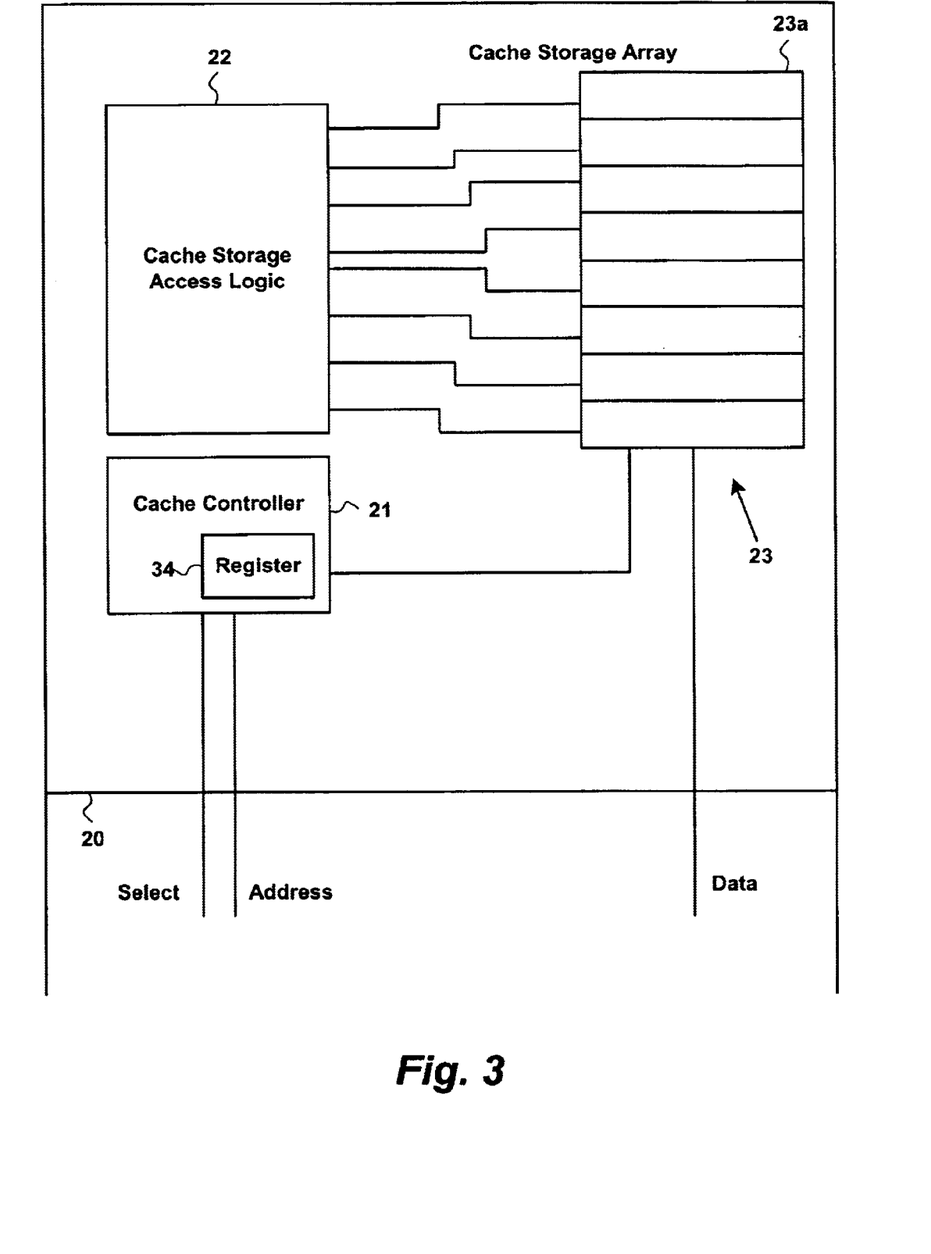
FIG. 3 is a more detailed block diagram of the cache memory of FIG. 1.

A more detailed block diagram of the cache memory 20 is shown in FIG. 3. Address information (e.g., from processor 10 in FIG. 2) is supplied to a cache controller 21 in cache memory 20. In this example, cache controller performs an address comparison operation to determine if the address of the block that is sought to be read from or written to is present in a cache storage array 23 (e.g., having eight ways, such as way 23a). If the address is found then data from processor 10 is written to the appropriate way of cache storage array 23 (during a write operation) or data from the selected way is sent back to the processor (during a read operation).

If there is no match between the address sent by processor 10 and those addresses that are currently residing in cache 20, an access must be made to main memory 30 (potentially resulting in one of the ways in cache storage array 23 being evicted). In this embodiment, cache controller 21 performs an LRU eviction procedure to determine which of the ways in cache storage array 23 is to be evicted as described below.

As set forth above, the cache memory could be shared between two or more components (e.g., first component 11a, second component 11b, . . . , nth component 11n). In this example, it is assumed that first component 11a includes the execution of instructions from a first thread (thread 0) and second component 11b includes the execution of instructions from a second thread (thread 1). In a conventional cache system, the cache memory is shared equally between each thread (i.e., each thread can cause an eviction of any way in the cache memory). Accordingly, when processor 10 accesses cache memory 20, there is an indication as to which thread is being executed during this cache access. This can be achieved in a variety of ways. In FIGS. 2–3, the indication is provided by processor 10 by providing an appropriate signal on a component "Select" line. An indication of which thread is being executed during the cache access can also be provided through the operating system (e.g., the Window® 95 operating system from Microsoft Corporation, Redmond, Wash.).

According to an embodiment of the present invention, one or more registers 34 are provided in cache controller 21 so as to selectively partition the cache resource among two or more components. In this example, each way of cache storage array 23 can be assigned solely to any individual component or can be assigned to be shared by two or more components. Two methods for providing the allocation of the cache memory are described below with respect to a LRU replacement algorithm.

In the first method, a seven-bit array L[0 . . . 6] can be used to indicate which of the eight ways (0 through 7) in cache stored array 23 has been least recently used as shown in Table I.

TABLE I

| | |
|---|---|
| L[0] | identifies whether the LRU way is in the lower quad (ways 0–3) or in the upper quad (ways 4–7) |
| L[1] | identifies whether the LRU way is in the first pair (ways 0–1) or second pair (ways 2–3) of the lower quad |
| L[2] | identifies whether the LRU way is in the first pair (ways 4–5) or second pair (ways 6–7) of the upper quad |
| L[3] | identifies which of the ways in the first pair of the lower quad is the LRU way |
| L[4] | identifies which of the ways in the second pair of the lower quad is the LRU way |
| L[5] | identifies which of the ways in the first pair of the upper quad is the LRU way |
| L[6] | identifies which of the ways in the second pair of the upper quad is the LRU way |

Array L[0 . . . 6] is a known manner for identifying an LRU way in a cache storage array and is typically updated prior to or after each read/write operation to the cache storage array. For example, a value for L[0 . . . 6] of {1111110} indicates that way 6 is the LRU way because L[0]=1 indicates that the LRU way is in the upper quad, L[2]=1 indicates that the LRU way is in the second pair of the upper quad, and L[6]=0 indicates that way 6 is the LRU way. As each way is updated (i.e., after a write or read operation to the way), the L[0 . . . 6] array is modified as shown in Table II.

TABLE II

| | Values for L [0 . . . 6] | | | | | | |
|---|---|---|---|---|---|---|---|
| | 0 | 1 | 2 | 3 | 4 | 5 | 6 |
| Update[0] | 1 | 1 | x | 1 | x | x | x |
| Update[1] | 1 | 1 | x | 0 | x | x | x |
| Update[2] | 1 | 0 | x | x | 1 | x | x |
| Update[3] | 1 | 0 | x | x | 0 | x | x |
| Update[4] | 0 | x | 1 | x | x | 1 | x |
| Update[5] | 0 | x | 1 | x | x | 0 | x |
| Update[6] | 0 | x | 0 | x | x | x | 1 |
| Update[7] | 0 | x | 0 | x | x | x | 0 |

By way of example, when way 1 is updated, bits 0 and 1 of the L[0 . . . 6] array are set to "1" and bit 3 of the array is set to "0" (entries marked with "x" are not modified). Thus, after the L[0 . . . 6] array is initially set to all "0's," the array can be used to indicate which way is the LRU way. Accordingly, at any particular time, a way is a candidate for eviction if the boolean equation for that way is true as shown in Table III.

TABLE III

Evict(0) = NOT(L[0]) AND NOT(L[1]) AND NOT(L[3])
Evict(1) = NOT(L[0]) AND NOT(L[1]) AND L[3]
Evict(2) = NOT(L[0]) AND L[1] AND NOT(L[4])
Evict(3) = NOT(L[0]) AND L[1] AND L[4]

TABLE III-continued

Evict(4) = L[0] AND NOT(L[2]) AND NOT(L[5])
Evict(5) = L[0] AND NOT(L[2]) AND L[5]
Evict(6) = L[0] AND L[2] AND NOT(L[6])
Evict(7) = L[0] AND L[2] AND L[6]

Partitioning of the cache, for example for two components, is then achieved using four mask values (e.g., stored in a register 34 in the cache controller). In this example, the execution of two threads shares the cache memory and each thread has assigned to it first and second mask values. The first of these mask values are eight bit arrays (V0[0 . . . 7] and V1 [0 . . . 7]) of the eviction outputs that should be used (i.e., which addressable blocks of the cache are available for eviction). The second of these mask values are seven bit arrays (E0[0 . . . 6] and E1 [0 . . . 6]) which control which LRU bits from the L[0 . . . 6] array should be used to make an eviction decision.

It is assumed that two control signals are present, t0 and t1, which indicate which component is accessing the cache memory when an eviction needs to be made (e.g., when thread 0 is accessing the cache when an eviction is needed, t0 is set to "1" and t1 is set to "0"). Using the values for t0 and t1, the second mask array is used to determine which ways can be evicted according to the boolean equations shown in Table IV.

TABLE IV

Evict(0) = [ If ((E0[0] AND t0) OR (E1[0] AND t1)) then NOT(L[0]) else 1 ]
AND
[ If ((E0[1] AND t0) OR (E1[1] AND t1)) then NOT(L[1]) else 1 ]
AND
[ If ((E0[3] AND t0) OR (E1[3] AND t1)) then NOT(L[3]) else 1 ]

Evict(1) = [ If ((E0[0] AND t0) OR (E1[0] AND t1)) then NOT(L[0]) else 1 ]
AND
[ If ((E0[1] AND t0) OR (E1[1] AND t1)) then NOT(L[1]) else 1 ]
AND
[ If ((E0[3] AND t0) OR (E1[3] AND t1)) then L[3] else 1 ]

Evict(2) = [ If ((E0[0] AND t0) OR (E1[0] AND t1)) then NOT(L[0]) else 1 ]
AND
[ If ((E0[1] AND t0) OR (E1[1] AND t1)) then L[1] else 1 ] AND
[ If ((E0[4] AND t0) OR (E1[4] AND t1)) then NOT(L[4]) else 1 ]

Evict(3) = [ If ((E0[0] AND t0) OR (E1[0] AND t1)) then NOT(L[0]) else 1 ]
AND
[ If ((E0[1] AND t0) OR (E1[1] AND t1)) then L[1] else 1 ] AND
[ If ((E0[4] AND t0) OR (E1[4] AND t1)) then L[4] else 1 ]

Evict(4) = [ If ((E0[0] AND t0) OR (E1[0] AND t1)) then L[0] else 1 ] AND
[ If ((E0[2] AND t0) OR (E1[2] AND t1)) then NOT(L[2]) else 1 ]
AND
[ If ((E0[5] AND t0) OR (E1[5] AND t1)) then NOT(L[5]) else 1 ]

Evict(5) = [ If ((E0[0] AND t0) OR (E1[0] AND t1)) then L[0] else 1 ] AND
[ If ((E0[2] AND t0) OR (E1[2] AND t1)) then NOT(L[2]) else 1 ]
AND
[ If ((E0[5] AND t0) OR (E1[5] AND t1)) then L[5] else 1 ]

Evict(6) = [ If ((E0[0] AND t0) OR (E1[0] AND t1)) then L[0] else 1 ] AND
[ If ((E0[2] AND t0) OR (E1[2] AND t1)) then L[2] else 1 ] AND
[ If ((E0[6] AND t0) OR (E1[6] AND t1)) then NOT(L[6]) else 1 ]

Evict(7) = [ If ((E0[0] AND t0) OR (E1[0] AND t1)) then L[0] else 1 ] AND
[ If ((E0[2] AND t0) OR (E1[2] AND t1)) then L[2] else 1 ] AND
[ If ((E0[6] AND t0) OR (E1[6] AND t1)) then L[6] else 1 ]

In the equations of Table IV, the t0 and t1 values select either the E0[0 . . . 6] or E1 [0 . . . 6] masks, and the E0[0 . . . 6] and E1 [0 . . . 6] masks are used to mask which of the L[0 . . . 6] bits are to be used to assign values to Evict(0) to Evict(7). The Evict(0) to Evict(7) values can then be used in the partition eviction (Pevict) equations of Table V.

TABLE V

Pevict(0) = ((V0[0] AND t0) OR (V1 [0] AND t1)) AND Evict(0)
Pevict(1) = ((V0[1] AND t0) OR (V1 [1] AND t1)) AND Evict(1)
Pevict(2) = ((V0[2] AND t0) OR (V1 [2] AND t1)) AND Evict(2)
Pevict(3) = ((V0[3] AND t0) OR (V1 [3] AND t1)) AND Evict(3)
Pevict(4) = ((V0[4] AND t0) OR (V1 [4] AND t1)) AND Evict(4)
Pevict(5) = ((V0[5] AND t0) OR (V1 [5] AND t1)) AND Evict(5)
Pevict(6) = ((V0[6] AND t0) OR (V1 [6] AND t1)) AND Evict(6)
Pevict(7) = ((V0[7] AND t0) OR (V1 [7] AND t1)) AND Evict(7)

The operation of the equations in Tables IV and V is described below with two examples. In a first example the cache resource is shared such that ways 0–3 are dedicated to execution of thread 0 (t0) and ways 4–7 are dedicated to execution of thread 1 (t1). Accordingly, the second masks would be E0[0 . . . 6]=0101100 and E1[0 . . . 6]=0010011 and the first masks would be V0[0 . . . 7]=11110000 and V1[0 . . . 7]=00001111. In this example, the execution of thread 0 seeks to access the cache resource and an eviction of one of the ways is necessary (t0=1 and t1=0). In the second mask, E0[0 . . . 6], bits 1, 3, and 4 are set. Looking at the equations in Table IV, only L[1], L[3], and L[4] are used to set the values for Evict(0) to Evict(3) (Evict(4) to Evict(7) are each set to 1 and are not used due to the partition of the cache resource). Since, the value for L[0] indicates whether ways 0–3 or ways 4–7 contain the LRU way, this value is not needed since in this partitioning example only ways 0–3 would be used for the first component (thread 0). Since, the values for L[2], L[5], and L[6] refer to which of ways 4–7 are the LRU way, these values are also not needed for this partitioning example. Once the values for at least Evict(0) to Evict(3) have been set, the first mask V0[0 . . . 7] masks out Evict values which are not available in this partitioning example. Accordingly, referring to the equations of Tables IV and V, values for Pevict(0) to Pevict(3) will depend on the values of L[1], L[3], and L[4] while the values for Pevict(4) to Pevict(7) are set to 0. Thus, the LRU way of ways 0–3 will be selected for eviction even if the LRU way of ways 0–7 resides in ways 4–7.

In the second example, ways 0–1 are dedicated to the execution of thread 0, ways 2–3 are dedicated to the execution of thread 1 and ways 4–7 are shared between the two threads. Accordingly, the second masks would be E0[0 . . . 6]=1011011 and E1[0 . . . 6]=1010111 and the first masks would be V0[0 . . . 7]=11001111 and V1 [0 . . . 7]=00111111. During an access by thread 0 that requires an eviction in ways 0–7, the value for L[1] is not needed because L[1] indicates whether ways 0–1 or ways 2–3 include the LRU way, and in this partitioning scheme, ways 2–3 are unavailable for eviction. The value for L[4] is also not needed for much of the same reason (i.e., L[4] indicates whether way 2 or way 3 is the LRU way and neither are used in this partitioning example). The second mask V0[0 . . . 7] works to make sure that Pevict(2) and Pevict(3) are set to 0 so that ways 2–3 are unavailable for eviction.

The first embodiment described above can be described as a "pseudo" LRU scheme because the determination of the available LRU way may not be precise in each eviction operation. The second embodiment described below can be referred to as a "true" LRU scheme because it is more accurate in determining which of the available ways for eviction is the least recently used.

In this example of the second embodiment, a twenty-eight bit array is used where each bit indicates a relationship between two ways in an eight way cache resource. For example, and referring to Table VI, the binary value for L[15] indicates whether way 2 (as indicated in the column heading) is more recently used than way 5 (as indicated in the row heading).

TABLE VI

|   | 0 | 1 | 2 | 3 | 4 | 5 | 6 |
|---|---|---|---|---|---|---|---|
| 0 |   |   |   |   |   |   |   |
| 1 | 0 |   |   |   |   |   |   |
| 2 | 1 | 7 |   |   |   |   |   |
| 3 | 2 | 8 | 13 |   |   |   |   |
| 4 | 3 | 9 | 14 | 18 |   |   |   |
| 5 | 4 | 10 | 15 | 19 | 22 |   |   |
| 6 | 5 | 11 | 17 | 20 | 23 | 25 |   |
| 7 | 6 | 12 | 17 | 21 | 24 | 26 | 27 |

Given this array, each time that a way is updated, several of the bits in the L[0 . . . 27] array are updated so as to give an accurate indication of the LRU way. In this embodiment, all bits in the L[0 . . . 27] array are initialized to 0 and when way n (where n=0 to 7) is updated, elements in row n should be set to 0 and all elements in column n should be set to 1 (see Table VI). The updating for the values in the L[0 . . . 27] array for each type of update is shown in Table VII.

TABLE VII

| Values for L [0 . . . 27] |
|---|
| 2 2 2 2 2 2 2 2 1 1 1 1 1 1 1 1 1 1 1 1 1 1 1 1 1 1 1 1 |
| 7 6 5 4 3 2 1 0 9 8 7 6 5 4 3 2 1 0 9 8 7 6 5 4 3 2 1 0 |

| | |
|---|---|
| Initialization | 0 0 0 0 0 0 0 0 0 0 0 0 0 0 0 0 0 0 0 0 0 0 0 0 0 0 0 0 |
| Update(0) | x x x x x x x x x x x x x x x x x x x x x 1 1 1 1 1 1 1 |
| Update(1) | x x x x x x x x x x x x x x x 1 1 1 1 1 1 x x x x x x 0 |
| Update(2) | x x x x x x x x x x 1 1 1 1 1 x x x x x 0 x x x x x 0 x |
| Update(3) | x x x x x x 1 1 1 1 x x x x x 0 x x x x 0 x x x x 0 x x |
| Update(4) | x x x 1 1 1 x x x 0 x x x x 0 x x x x 0 x x x x 0 x x x |
| Update(5) | x 1 1 x x 0 x x 0 x x x 0 x x x x 0 x x x x 0 x x x x |
| Update(6) | 1 x 0 x 0 x x 0 x x x 0 x x x x 0 x x x x 0 x x x x x |
| Update(7) | 0 0 x 0 x x x 0 x x x x 0 x x x x x 0 x x x x x 0 x x x x x x |

As in the Pseudo LRU method above, those entries marked with an "x" are unchanged during the updating process. Victim selection for each way (0 to 7), using the L[0 . . . 27] array, is the complement of the Update entries in Table VII. This is shown for Evict(0) to Evict (7) in Table VIII, where an apostrophe ("'") indicates a boolean NOT function.

TABLE VIII

| | |
|---|---|
| Evict (0) = | L[0]' AND L[1]' AND L[2]' AND L[3]' AND L[4]' AND L[5]' AND L[6]' |
| Evict (1) = | L[0] AND L[7]' AND L[8]' AND L[9]' AND L[10]' AND L[11]' AND L[12]' |
| Evict (2) = | L[1] AND L[7] AND L[13]' AND L[14]' AND L[15]' AND L[16]' AND L[17]' |
| Evict (3) = | L[2] AND L[8] AND L[13] AND L[18]' AND L[19]' AND L[20]' AND L[21]' |
| Evict (4) = | L[3] AND L[9] AND L[14] AND L[18] AND L[22]' AND L[23]' AND L[24]' |
| Evict (5) = | L[4] AND L[10] AND L[15] AND L[19] AND L[22] AND L[25]' AND L[26]' |
| Evict (6) = | L[5] AND L[11] AND L[16] AND L[20] AND L[23] AND L[25] AND L[27]' |
| Evict (7) = | L[6] AND L[12] AND L[17] AND L[21] AND L[24] AND L[26] AND L[27] |

For example, to evict way 1, L[0] should be 1 (indicating that way 0 is more recently used than way 1) and L[7 . . . 12] should all be set to 0 (indicating that each of ways 2–7 are more recently used than way 1).

According to an embodiment of the present invention where the execution of two threads shares a cache resource, a first mask value is selected for each thread to partition the cache resource as described in further detail below. In this embodiment, three control signals are provided (e.g., in a manner similar to the first method described above)—ST (single thread), t0 (thread 0), and t1 (thread 1). When ST is set to "1" (i.e., indicating that a single thread, rather than multiple threads, are accessing the cache memory), t0 and t1 are set to "1" as well. In a multi-threaded environment, ST is set to "0" and one of t0 and t1 is set to "1" while the other is set to "0." The operation of the first mask value is shown by way of an example, below.

In this example, ways 0 and 1 are dedicated to the execution of thread 0, ways 6 and 7 are dedicated to the execution of thread 1, and ways 2–5 are shared between threads 0 and 1. The first mask for thread 0 would be M0[0 . . . 7]=11111100 and for thread 1 would be M1[0 . . . 7]=00111111. Using the control signals, a first or auxiliary mask value can be created depending on the environment (e.g., single thread or multi-thread environment) as shown in Table IX.

TABLE IX

| |
|---|
| M[0] = ST OR (If t0 = 1 then M0[0] else If t1 = 1 then M1[0] else 0) |
| M[1] = ST OR (If t0 = 1 then M0[1] else If t1 = 1 then M1[1] else 0) |
| M[2] = ST OR (If t0 = 1 then M0[2] else If t1 = 1 then M1[2] else 0) |
| M[3] = ST OR (If t0 = 1 then M0[3] else If t1 = 1 then M1[3] else 0) |
| M[4] = ST OR (If t0 = 1 then M0[4] else If t1 = 1 then M1[4] else 0) |
| M[5] = ST OR (If t0 = 1 then M0[5] else If t1 = 1 then M1[5] else 0) |
| M[6] = ST OR (If t0 = 1 then M0[6] else If t1 = 1 then M1[6] else 0) |
| M[7] = ST OR (If t0 = 1 then M0[7] else If t1 = 1 then M1[7] else 0) |

As seen from Table IX, the individual bits of the auxiliary mask value are set to 1 if ST is set to 1 or to the appropriate bits of the M0[0 . . . 7] and M1[0 . . . 7] arrays if only one of the t0 and t1 values are set (if neither are set, then a way remains unaccessible). The auxiliary mask is then used to mask the L[0 . . . 27] array so as to set the appropriate bit in an eviction array W[0 . . . 7] as shown in Table X.

TABLE X

| | |
|---|---|
| W[0] = | M[0] AND (if M[1] then (L[0])' else 1) AND (if M[2] then (L[1])' else 1) AND (if M[3] then (L[2])' else 1) AND (if M[4] then (L[3])' else 1) AND (if M[5] then (L[4])' else 1) AND (if M[6] then (L[5])' else 1) AND (if M[7] then (L[6])' else 1) |
| W[1] = | (if M[0] then L[0] else 1) AND M[1] AND (if M[2] then (L[7])' else 1) AND (if M[3] then (L[8])' else 1) AND (if M[4] then (L[9])' else 1) AND (if M[5] then (L[10])' else 1) AND (if M[6] then (L[11])' else 1) AND (if M[7] then (L[12])' else 1) |
| W[2] = | (if M[0] then L[1] else 1) AND (if M[1] then L[7] else 1) AND M[2] AND (if M[3] then (L[13])' else 1) AND (if M[4] then (L[14])' else 1) AND (if M[5] then (L[15])' else 1) AND (if M[6] then (L[16])' else 1) AND (if M[7] then (L[17])' else 1) |
| W[3] = | (if M[0] then L[2] else 1) AND (if M[1] then L[8] else 1) AND (if M[2] then L[13] else 1) AND M[3] AND (if M[4] then (L[18])' else 1) AND (if M[5] then (L[19])' else 1) AND (if M[6] then (L[20])' else 1) AND (if M[7] then (L[21])' else 1) |
| W[4] = | (if M[0] then L[3] else 1) AND (if M[1] then L[9] else 1) AND (if M[2] then L[14] else 1) AND (if M[3] then L[18] else 1) AND M[4] AND (if M[5] then (L[22])' else 1) AND (if M[6] then (L[23])' else 1) AND (if M[7] then (L[24])' else 1) |
| W[5] = | (if M[0] then L[4] else 1) AND (if M[1] then L[10] else 1) AND (if M[2] then L[15] else 1) AND (if M[3] then L[19] else 1) AND (if M[4] then L[22] else 1) AND M[5] AND (if M[6] then (L[25])' else 1) AND (if M[7] then (L[26])' else 1) |
| W[6] = | (if M[0] then L[5] else 1) AND (if M[1] then L[11] else 1) AND (if M[2] then L[16] else 1) AND (if M[3] then L[20] else 1) AND (if M[4] then L[23] else 1) AND (if M[5] then (L[25]) else 1) AND M[6] AND(if M[7] then (L[27])' else 1) |
| W[7] = | (if M[0] then L[6] else 1) AND (if M[1] then L[12] else 1) AND (if M[2] then L[17] else 1) AND (if M[3] then L[21] else 1) AND (if M[4] then L[24] else 1) AND (if M[5] then L[26] else 1) AND (if M[6] then L[27] else 1) AND M[7] |

Accordingly, the auxiliary mask value in this embodiment serves at least two purposes. First, it sets particular eviction bits in array W[0 . . . 7] if the corresponding way is dedicated to the other thread. For example, if thread 0 is being executed, then bits W[6] and W[7] will be set to 0 in this example making ways 6 and 7 unavailable for eviction. Second, the auxiliary mask value selects which bits from the L[0 . . . 27] array will be used to set the particular eviction bits in W[0 . . . 7]. For example, if thread 0 is being executed, then certain values of the L[0 . . . 27] array are not needed to find the LRU way of ways 0 to 5 (the only available ways in this example). Thus, referring back to Table VI, bits of the L[0 . . . 27] array in rows 6 and 7 and column 6 are not needed to set values in W[0] to W[5] and thus are masked out by the auxiliary mask.

Figure 4A:
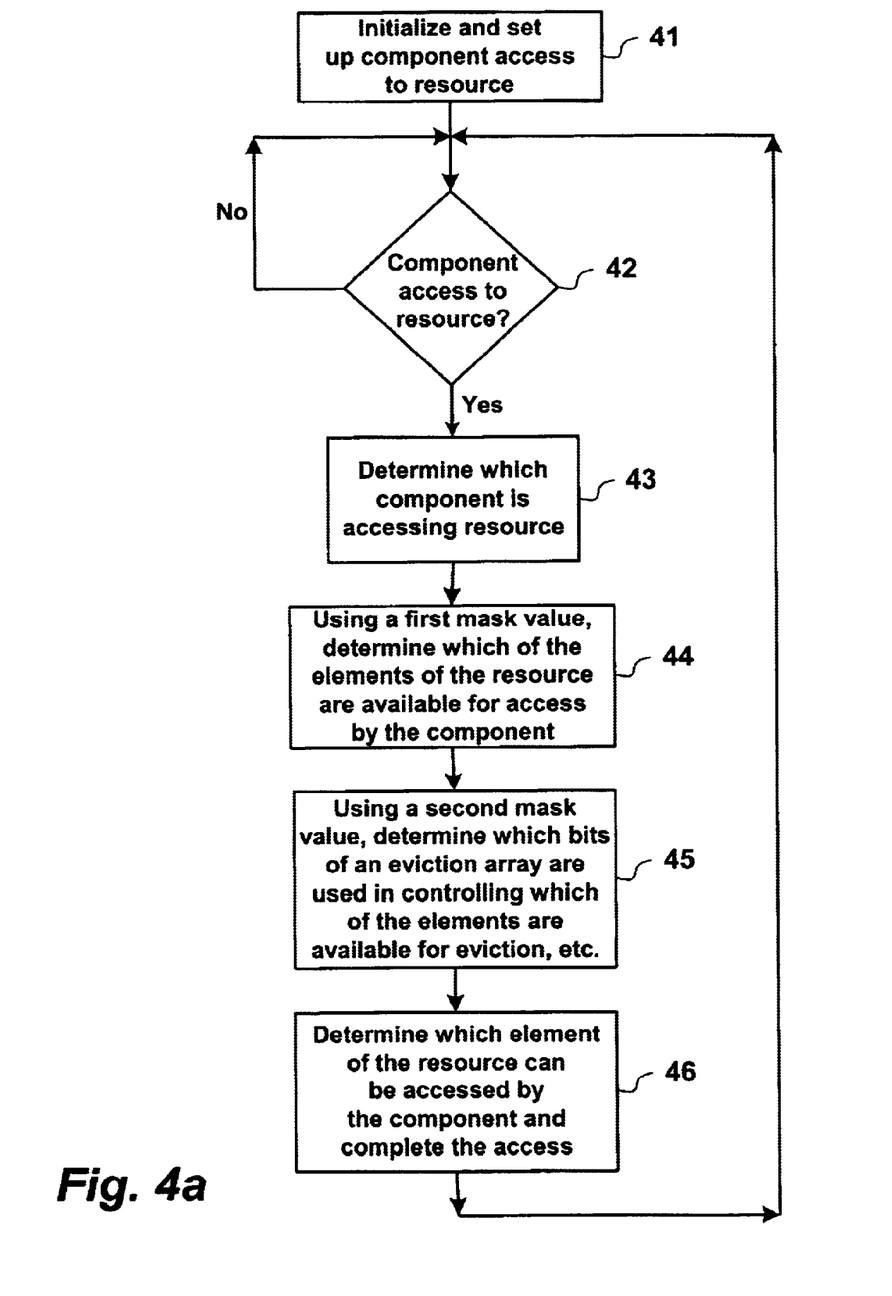
FIGS. 4a and b are flow diagrams of methods according to embodiments of the present invention.

Referring to FIG. 4*a*, a flow diagram of a method according to a first embodiment of the present invention is shown. Though this method can be implemented using the systems shown in FIGS. 1–3, one skilled in the art will appreciate that this method can also be implemented as a set of instructions or code residing in a storage medium and executed by a processor or the like. In step 41 component access to the resource is initialized and set up. For example, it is determined which, if any, of the components will have sole access to one or more of the elements of the resource (e.g., which component will be able to cause an eviction, erasure, etc. of one or more of the elements to the exclusion of the other components). It is also determined which, if any, of the components will share access to one or more of the elements of the resource. As described above this determination could result in the generation of the first and/or second mask values.

In step 42, it is determined whether a component is accessing the resource (e.g., where an eviction of one of the elements needs to take place). If a component is seeking to access the resource, control passes to step 43 to determine which component (e.g., execution of a particular thread) seeks access to the resource. With this information, the first mask value is used to determine which of the elements of the resource are available for access for the component (step 44). In step 45, a second mask value may be used to determine which bits of an eviction array are used in controlling which of the elements are available for eviction, etc. In step 46 it is determined which element of the resource can be accessed by the component (e.g., the least recently used of the available elements), and the access (e.g., the eviction of the element) is completed. Control passes to decision block 42 for the next attempted access to the resource.

Figure 4B:
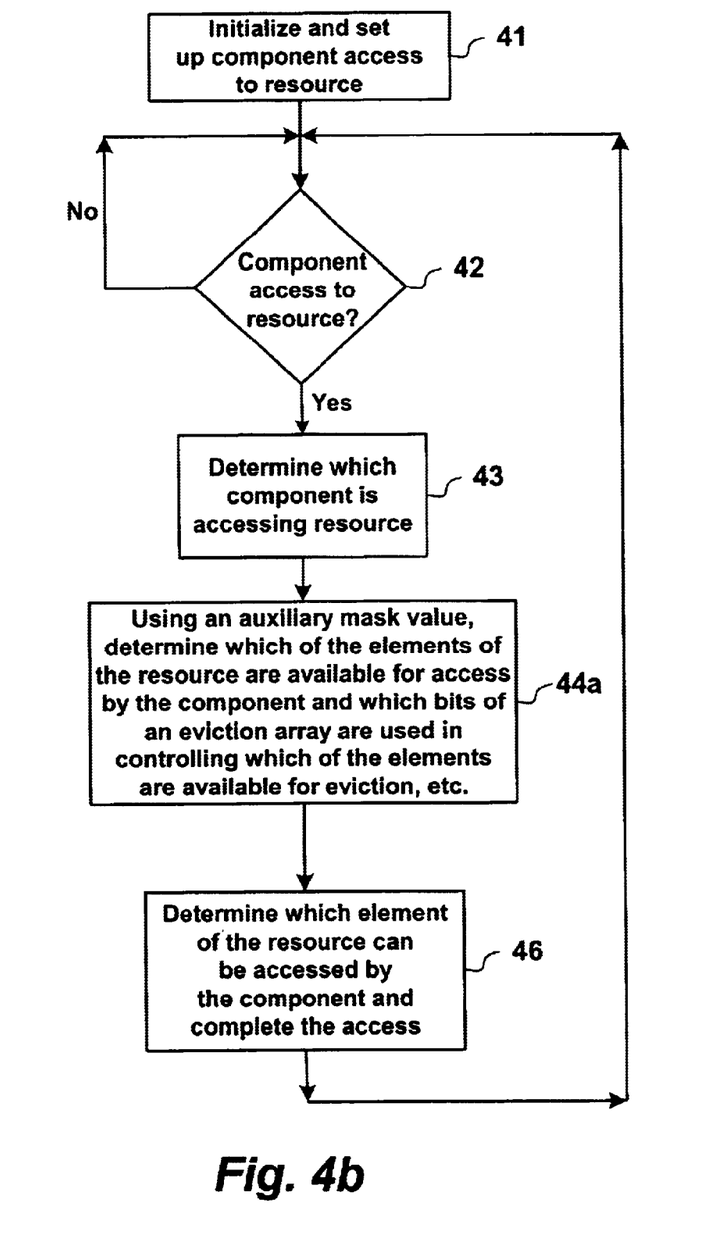

Referring to FIG. 4*b*, a flow diagram for a second embodiment of the present invention is shown. In FIG. 4*a*, steps 44 and 45 are performed for the "pseudo" LRU embodiment described above. The method shown in FIG. 4*b* is similar to that of FIG. 4*a* but is for the "true" LRU embodiment described above, and the auxiliary mask value is used instead of the first and second mask values. To that end, in step 44*a*, the auxiliary mask value is used to determine which of the elements of the resource are available for access by the component and which bits of an eviction array are used in controlling which of the elements are available for eviction, etc. as described above.

Although embodiments are specifically illustrated and described herein, it will be appreciated that modifications and variations of the present invention are covered by the above teachings and within the purview of the appended claims without departing from the spirit and intended scope of the invention. For example, though in the embodiments described above, one or more registers are provided to store mask values, one skilled in the art will appreciate that the values stored in the registers can be implemented as a permanent or semi-permanent part of the logic for the access controller to control access to the resource in a similar manner. Also, although the present invention is described with respect to the execution of two or more threads accessing a cache resource, the present invention can be expanded to other access devices accessing a cache memory. Furthermore, the present invention can also be expanded to resources other than memory structures.

What is claimed is:

1. An apparatus for partitioning a cache memory, comprising:

a cache memory having a plurality of addressable blocks;

first and second components coupled to said cache memory to access said cache memory;

a register coupled to said cache memory to store a first mask value and a second mask value, wherein access to addressable blocks of said cache memory is controlled based on said first mask value;

a processor coupled to said cache memory, wherein said first component includes execution of instructions by said processor from a first thread and said second component includes execution of instructions by said processor from a second thread;

wherein an eviction array is provided indicating a least recently used addressable block of said cache memory;

wherein said first mask value is an auxiliary mask value and said auxiliary mask value represents which of the addressable blocks of said cache memory are available for eviction; and wherein the second mask value selects which bits of said eviction array are used in controlling which of the addressable blocks of said cache memory are available for eviction.

2. A method for sharing a resource having a plurality of elements between at least first and second components, comprising:

controlling, with an access controller coupled to said at least first and second components, which of said at least first and second components are able to access which elements of said resource;

storing a first mask value, wherein access to the element of said resource is controlled based on said first mask value;

determining which of said first and second components is accessing said resource;

determining which of the elements of the resource are available for access by the component accessing said resource based on said first mask value;

providing an eviction array indicating the least recently used element of said resource;

providing a second mask value; and selecting which bits of said eviction array are used in controlling which of the elements of said cache memory are available for access by the component accessing said resource based on said second mask value.

3. The method of claim 2 further comprising:

determining which element of the resource can be accessed by the component accessing said resource.

4. A method for sharing a resource having a plurality of elements between at least first and second components, comprising:

controlling, with an access controller coupled to said at least first and second components, which of said at least first and second components are able to access which elements of said resource;

storing a first mask value, wherein access to the element of said resource is controlled based on said first mask value;

determining which of said first and second components is accessing said resource;

providing an eviction array indicating the least recently used element of said resource;

determining which of the elements of the resource are available for access by the component accessing said resource based on an auxiliary mask value; and selecting which bits of said eviction array are used in controlling which of the elements of said resource are available for access by the component accessing said resource based on said auxiliary mask value.

5. The method of claim 4 further comprising:

determining which element of the resource can be accessed by the component accessing said resource.

6. A set of instructions residing in a storage medium, said set of instructions to be executed by a processor to implement a method of sharing a resource having a plurality of elements between at least first and second components, the method comprising:

controlling, with an access controller coupled to said at least first and second components, which of said at least first and second components are able to access which elements of said resource;

storing a first mask value, wherein access to the element of said resource is controlled based on said first mask value;

determining which of said first and second components is accessing said resource; and determining which of the elements of the resource are available for access by the component accessing said resource based on said first mask value;

providing an eviction array indicating the least recently used element of said resource;

providing a second mask value; and selecting which bits of said eviction array are used in controlling which of the elements of said cache memory are available for access by the component accessing said resource based on said second mask value.

7. The set of instructions of claim 6, wherein the method further comprises:

determining which element of the resource can be accessed by the component accessing said resource.

8. A set of instructions residing in a storage medium, said set of instructions to be executed by a processor to implement a method of sharing a resource having a plurality of elements between at least first and second components, the method comprising:

controlling, with an access controller coupled to said at least first and second components, which of said at least first and second components are able to access which elements of said resource;

storing a first mask value, wherein access to the element of said resource is controlled based on said first mask value;

determining which of said first and second components is accessing said resource;

providing an eviction array indicating the least recently used element of said resource;

determining which of the elements of the resource are available for access by the component accessing said resource based on said auxiliary mask value; and selecting which bits of said eviction array are used in controlling which of the elements of said resource are available for access by the component accessing said resource based on said auxiliary mask value.

9. The set of instructions of claim 8, wherein the execution of said set of instructions further comprises:

determining which element of the resource can be accessed by the component accessing said resource.

* * * * *